Inventor:
Eddy T. McKaig,
by Walter E. Lombard,
Atty.

E. T. McKAIG.
GEARING FOR TRACTORS.
APPLICATION FILED JULY 19, 1918.

1,334,917.

Patented Mar. 23, 1920.
10 SHEETS—SHEET 5.

Inventor:
Eddy T. McKaig,
by Walter E. Lombard,
Atty.

E. T. McKAIG.
GEARING FOR TRACTORS.
APPLICATION FILED JULY 19, 1918.

1,334,917.

Patented Mar. 23, 1920.
10 SHEETS—SHEET 7.

Inventor:
Eddy T. McKaig,
by Walter E. Lombard,
Atty.

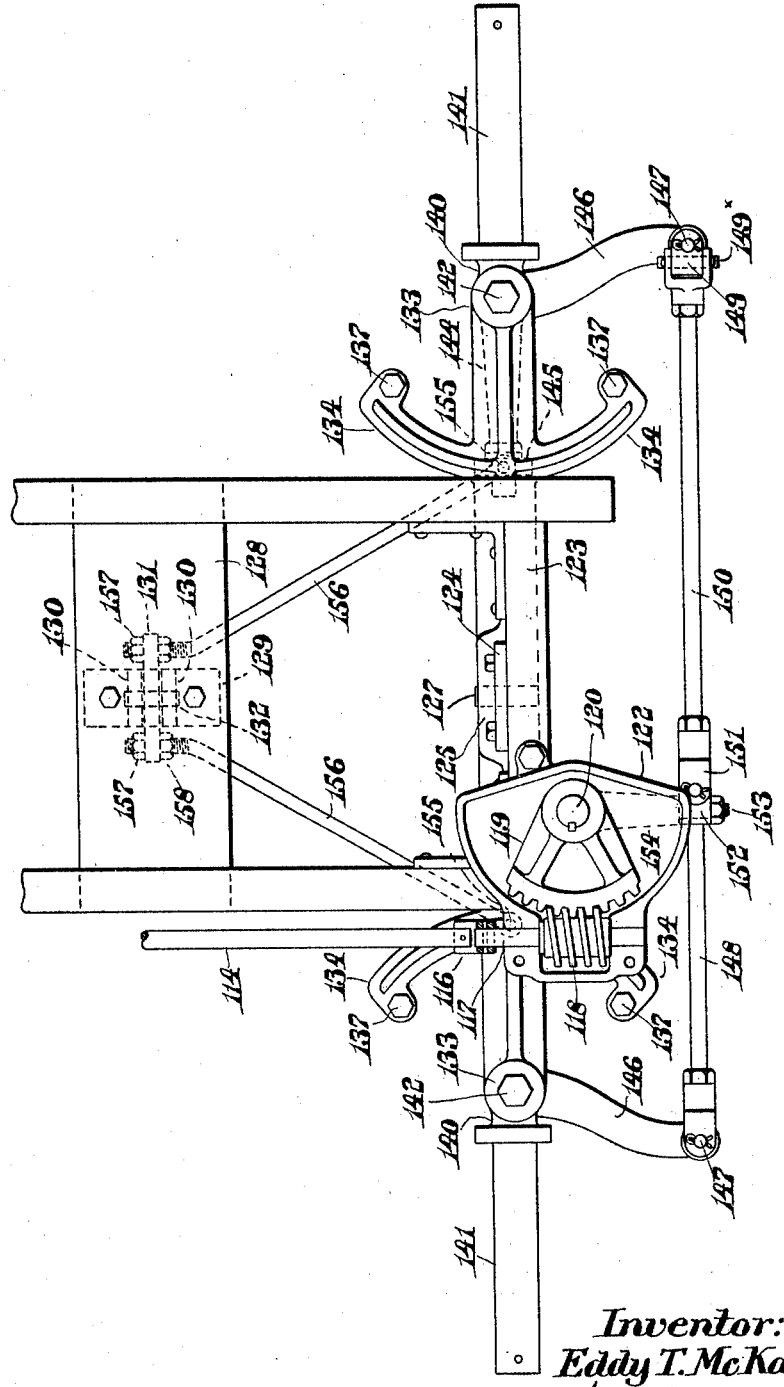

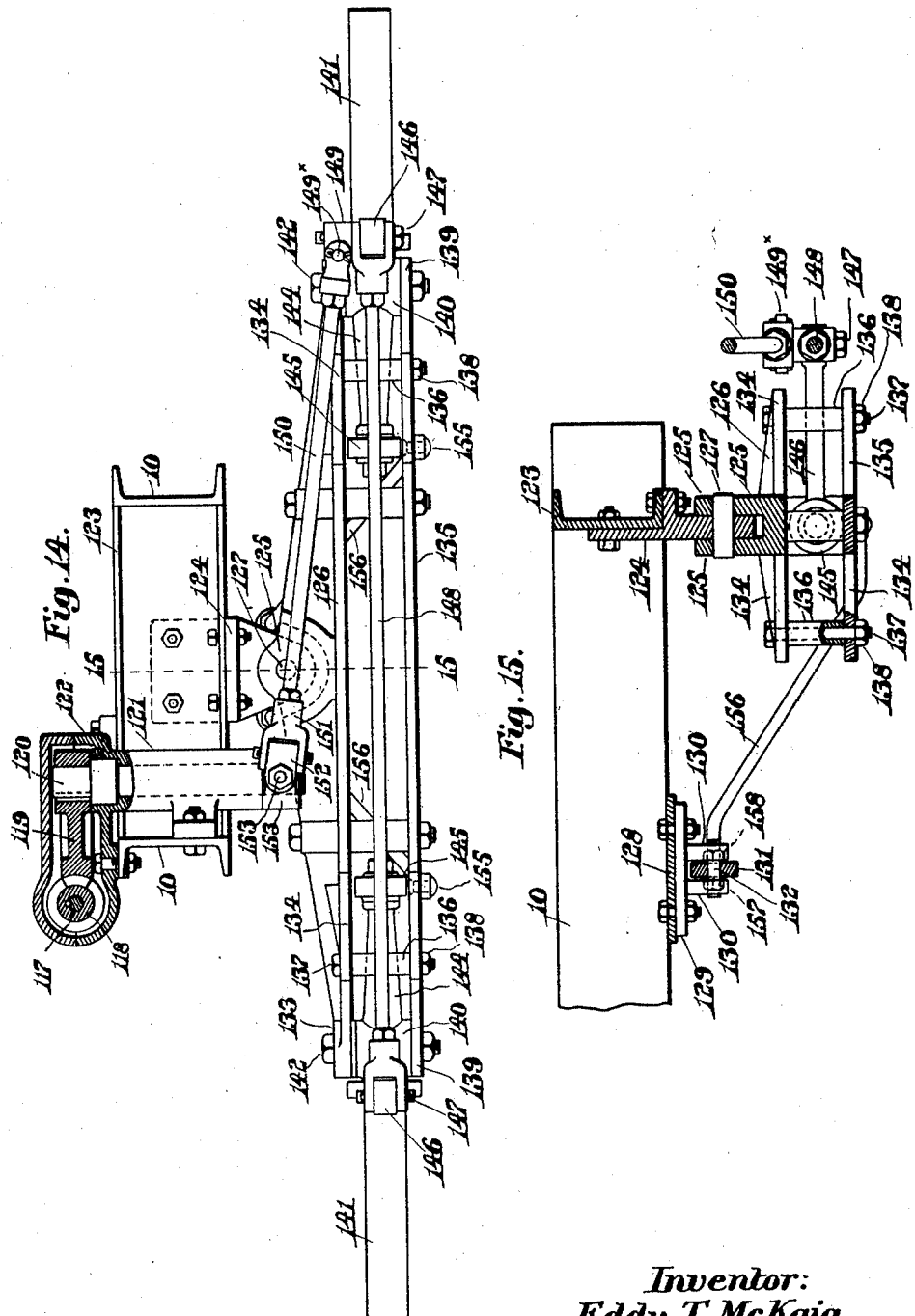

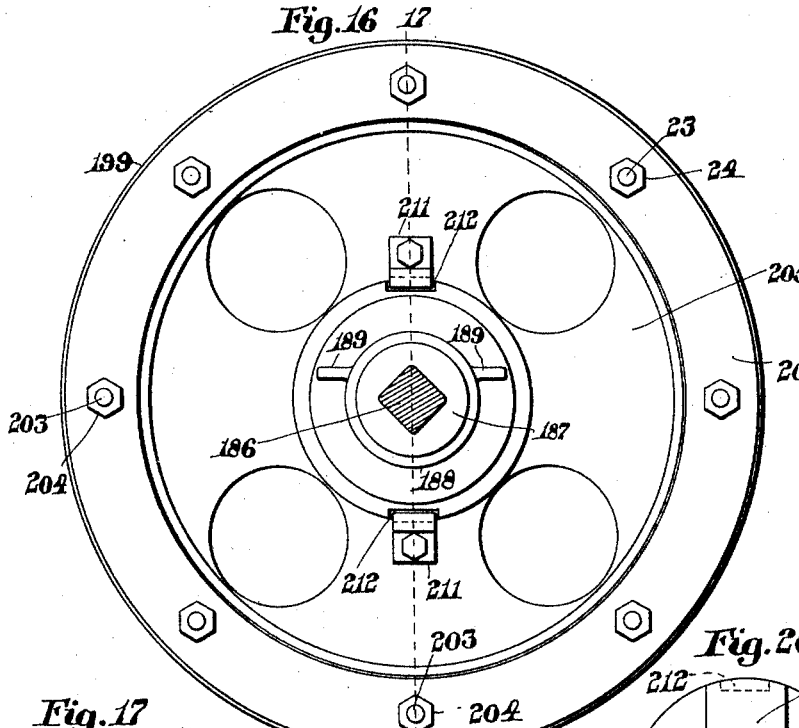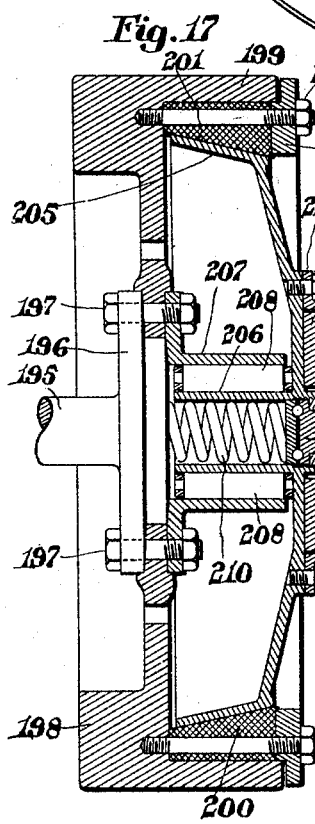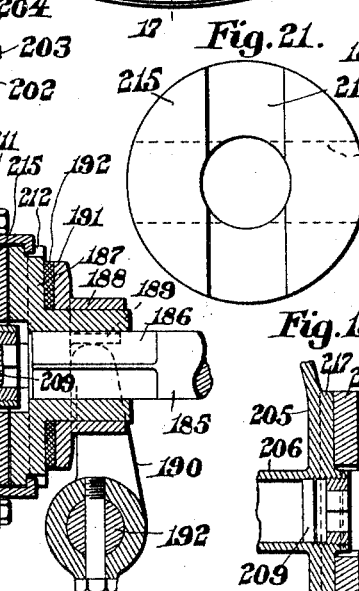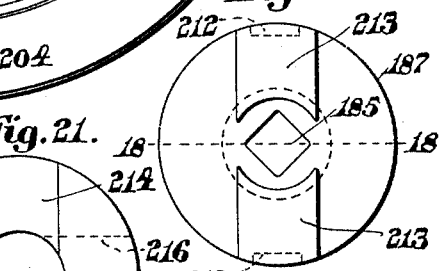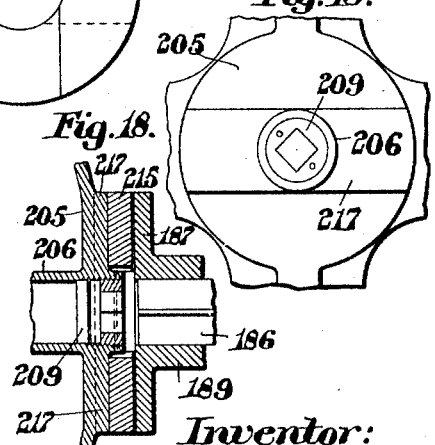

UNITED STATES PATENT OFFICE.

EDDY T. McKAIG, OF WAUKEGAN, ILLINOIS.

GEARING FOR TRACTORS.

1,334,917.   Specification of Letters Patent.   Patented Mar. 23, 1920.

Application filed July 19, 1918. Serial No. 246,255.

*To all whom it may concern:*

Be it known that I, EDDY T. McKAIG, a citizen of the United States of America, and a resident of Waukegan, in the county of Lake and State of Illinois, have invented certain new and useful Improvements in Gearing for Tractors, of which the following is a specification.

This invention relates to tractor engines, and more particularly to machines of this character which are designed for farm use, and it has for its object the production of a machine which may be used either to draw other machines, such as plows, harrows, etc., over the farm, or which, while stationary, may be used to furnish motive power to various kinds of machines.

The invention consists in certain novel features of construction and arrangement of parts which will be readily understood by reference to the description of the drawings and to the claims hereinafter given.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described, except as required by the scope of the appended claims.

Of the drawings:

Fig. 13 represents a plan of the front end of the frame and showing the mechanism for operating the front axle.

Fig. 14 represents a front elevation of the same, a portion thereof being shown in section.

Fig. 15 represents a transverse section on line 15, 15 on Fig. 14.

Fig. 16 represents an elevation of the main clutch mechanism for connecting the engine shaft with the various operating mechanisms.

Fig. 17 represents a transverse section of the same on line 17, 17 on Fig. 16.

Fig. 18 represents a section of the universal connection between the movable member of the main clutch mechanism and the driven shaft.

Fig. 19 represents an elevation of the central portion of the movable member of the main clutch mechanism.

Fig. 20 represents an elevation of the disk secured to the end of the driven shaft, and Fig. 21 represents an elevation of the intermediate disk connecting the driven shaft disk with the movable member of the main clutch mechanism.

Similar characters designate like parts throughout the various figures of the drawings.

Figure 1:
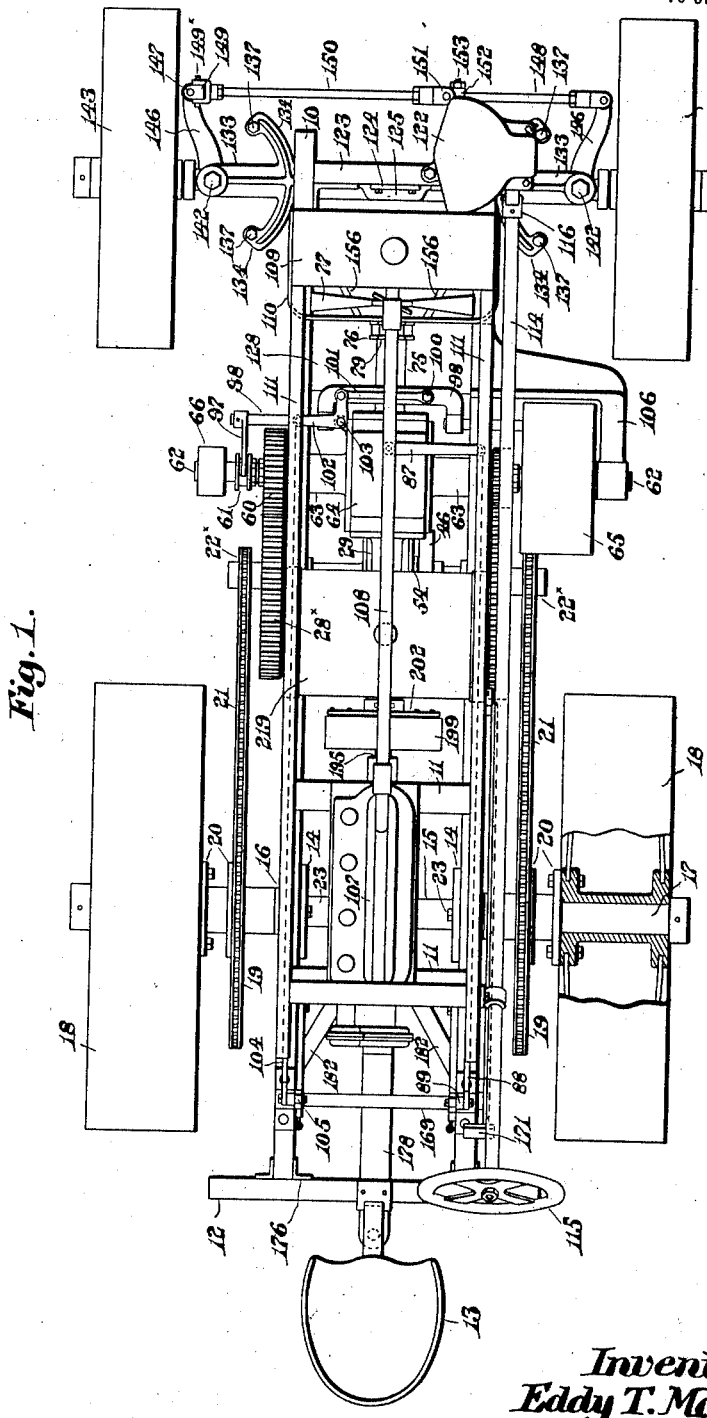
Figure 1 represents a plan of a tractor embodying the principles of the present invention.
Figure 2:
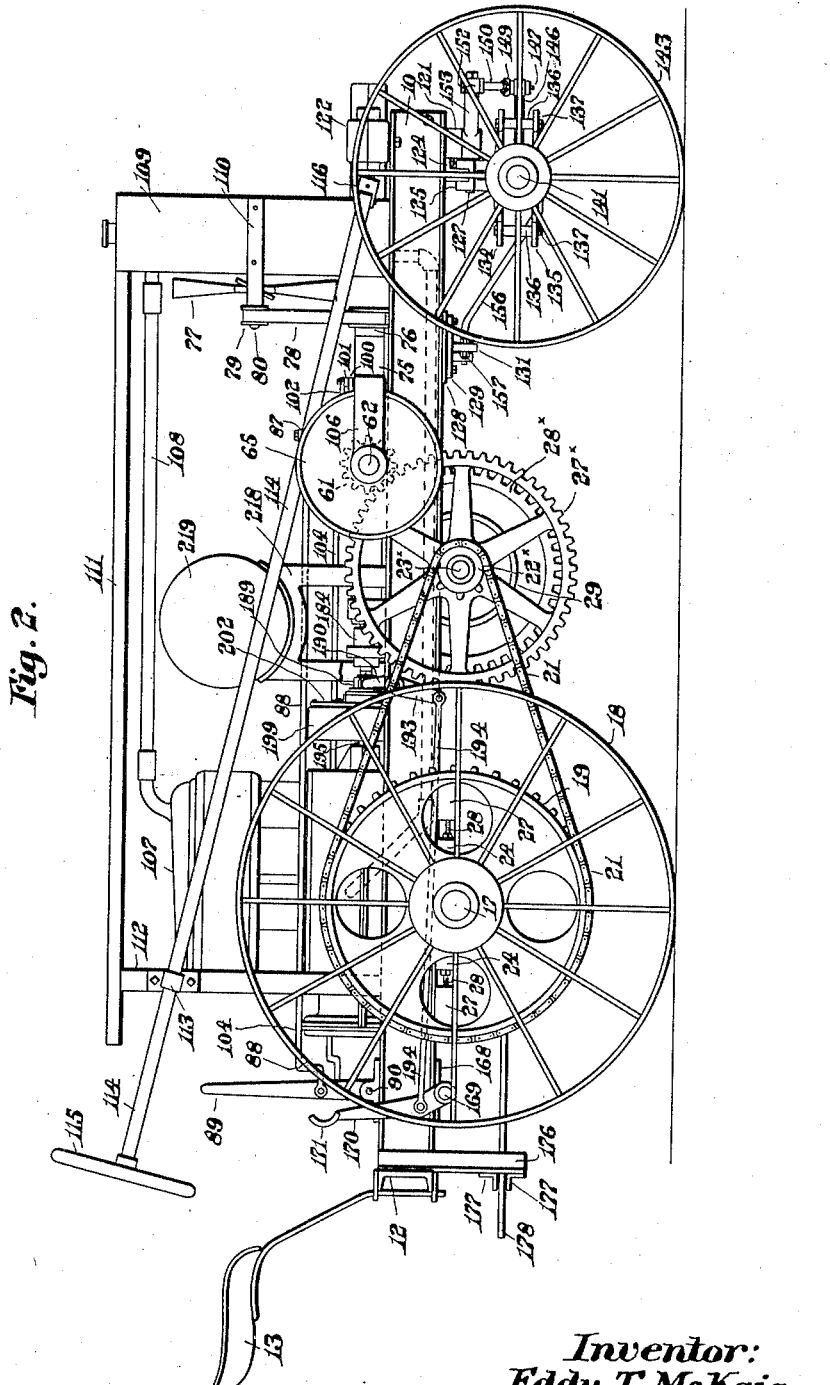
Fig. 2 represents a side elevation of the same.

In the drawings, 10—10 are two side frames connnected together by the ties 11, and at the rear end by the crossbar 12 to which is secured the operator's seat 13.

The side frames 10—10 have secured thereto near the rear ends thereof the plates 14—14 connnected together by the tie 15, these plates 14 each having an outwardly extending hub 16 from which projects a trunnion 17 adapted to receive the rear wheel 18.

Between the hub of the wheel 18 and the outer face of the hub 16 is interposed a sprocket wheel 19, the hub 20 of which is secured to the hub of said wheel, thereby rotating said wheel on the trunnion 17 by means of the driving chain 21.

The plate 14 is provided with a slot 22 through which extends a bolt 23 mounted in the side frame 10 and the hub 16 is provided with oppositely extending feet 24 having slots 25 therein, through which extend bolts 26 extending through the lower flange of said side member 10. The lower flange of the side member 10 has secured thereto blocks 27 in alinement with the feet 24.

Each block 27 has threaded thereto an adjustable member 28, the outer end of which bears upon the end of one of the feet 24, thereby providing a means whereby the underslung axle 15—17 may be adjusted longitudinally of the frame 10 in order to take up the slack in the chain 21.

The chain 21 passes over a sprocket wheel 22ˣ secured to and revoluble with the divided shaft 23ˣ mounted in sleeves 24ˣ—25ˣ revolubly mounted in bearing 26ˣ on the under side of the side frames 10, 10.

The sleeve 24ˣ has secured thereto a low speed gear 27ˣ and the other sleeve 25ˣ has secured thereto a high speed gear 28ˣ.

Each sleeve 24ˣ—25ˣ is provided at its inner end with a disk 29, said disks being secured to the opposite ends of an annular member 30, which, with the disks 29, forms a casing inclosing the bevel pinions 31 revolubly mounted on studs 32 extending inwardly from said annular member 30.

The bevel pinions 31 mesh with the bevel gears 33, 34 secured to and revoluble with the two sections of the divided shaft 23ˣ.

The bevel gear 33 is provided with a plurality of spaced notches 35, with which the locking bolt 36 is adapted to coact.

The spur gear 28ˣ is adapted to be rotated at a high rate of speed and rotate the casing 29—30 at the same rate of speed, while said casing is also adapted to be rotated at a slower speed by the spur gear 27ˣ

Obviously the driving wheels 18 will be driven through the sprocket wheels 22ˣ, chain 21, and sprocket wheel 19, at either a high or low speed, according to which spur gear 28ˣ or 27ˣ is in action.

The pinions 31 are prevented from becoming displaced from the studs 32 by means of the collars 37 secured to said studs by pins 38. The spaced notches 35 are formed in an annular flange 39 on the outer face of the gear 33, between which face and one of the disks 29 the locking bolt 36 is positioned between two parallel projections 40 formed upon said disk 29.

These projections 40 confine the movement of the locking bolt 36 in a direction radial to the axis of the jack shaft 23. The bolt 36 has two pins 41 and 42 projecting outwardly therefrom through a radial slot 43 in a disk 29.

The pin 42 is preferably cylindrical and normally rests in a notch 44 formed in the hub 45 of a brake drum 46. This brake drum 46 is preferably formed in two parts, secured together by the bolts 47, and is revolubly mounted on the sleeve 24ˣ.

Under normal conditions there is sufficient friction between the bore of the hub 45 and the periphery of the sleeve 24ˣ to cause the drum 46 to rotate with said sleeve 24ˣ, but when the brake is applied to said drum 46, the further rotation of the drum with the sleeve 24ˣ is prevented.

This braking is accomplished by means of the shoe 48 pivotally mounted at 49 in an end of a lever 50, pivoted at 51 to a stationary support 52, and provided at its opposite end with an operating rod 53, by which the operator may move said lever 50 about its pivot 51 to force the shoe 48 against the periphery of the drum 46, thereby preventing further rotation thereof.

To the pin 41 is secured an arm 54 to the outer ends of which are secured one end of the springs 55, the opposite ends of which are secured to members 55ˣ projecting from the outer face of a disk 29.

These springs 55 normally retain the bolt projection 42 in the bottom of the notch 44. On either side of the notch 44, the hub 45 is provided with outwardly extending cam faces 56 which, when moved relatively to said projection 42, are adapted to force the bolt 36 outwardly in a radial direction into one of the notches 35 formed in the flange 39 on the gear 33.

This movement of the sliding bolt 36 will lock the gear 33 to the disk 29 and thereby cause the two sections of the divided shaft 23ˣ to rotate in unison.

This locking of the gear 33 to the disk 29 will take place whenever the shoe 48 is applied to the drum 46 to prevent its further rotation with the sleeve 24ˣ, on which it is mounted.

It is obvious that inasmuch as the notch 44 is located midway between the two cam faces 56, the locking of the gear 33 to the disk 29 may be effected during the rotation of the sleeve 24ˣ in either direction.

Normally the bolt 36 is disengaged from the notches 35 and the sections of the shaft 23ˣ may be driven by either the high speed gear 28ˣ or the low speed gear 27ˣ.

When one of the driving wheels 18 meets an obstruction, or for any reason is retarded from turning, the other wheel, on account of the differential gearing, is permitted to rotate at a different speed.

It is often desirable, however, to neutralize the differential action and to insure the rotation of both driving wheels in unison at the same speed.

This can be easily accomplished by means of the construction herein shown, the operator moving the shoe 48 into contact with the periphery of the drum 46, thus retarding further rotation thereof with the sleeve 24ˣ on which it is mounted.

As soon as the rotary movement of the drum 46 is retarded, the disk 29 continuing to rotate, will cause the projection 42 to ride up on one of the cam faces 56, thus moving the bolt 36 radially into position to lock the gear 33 as previously explained.

The high speed gear 28ˣ meshes with the pinion 60 while the low speed gear 27ˣ meshes with the pinion 61, both of which are revolubly mounted on the service shaft 62 rotatable in the hubs 63 of a casing 64.

The shaft 62 is provided at opposite ends with the pulleys 65, 66 which are adapted to drive different machines. Around the shaft 62 and within the hubs 63 are positioned the hubs 67 of the gears 68, freely revoluble about the axis of the shaft 62 by means of the driving gear 69 meshing therewith. The ends of the hubs 67 abut against the bushings 67ˣ secured in the outer ends of the hubs 63 and form bearings for the service shaft 62.

The gear 69 is mounted on a shaft 70 freely revoluble in a hub 71 of the casing 64, said hub 71 being perpendicular to the shaft 62.

The hubs 63, 63 and 71 are all mounted in supports 72 secured to the frames 10 and 11.

The rear end of the shaft 70 is adapted to be connected to the motor in any well-known manner.

By means of the gear 69, motion in opposite directions is imparted to the gears 68, which, in turn, impart rotary movement to a gear 73 keyed to a shaft 74 in alinement with the shaft 70.

The shaft 74 is revolubly mounted in the hub 75 projecting from the casing 64, and has secured to its forward end the pulley 76 adapted to drive the fan 77 by means of a belt 78 passing over the pulley 79 on the fan shaft 80.

Keyed to and slidable on the shaft 62, between the gears 68, is a clutch member 81, provided at opposite ends with locking projections 82 adapted to coact with the locking projections 83 extending inwardly from the gears 68.

It is obvious that the shaft 62 may be driven in one direction by interlocking the clutch member 81 with the one gear 68 and in the reverse direction by interlocking said member 81 with the other gear 68.

Figure 3:
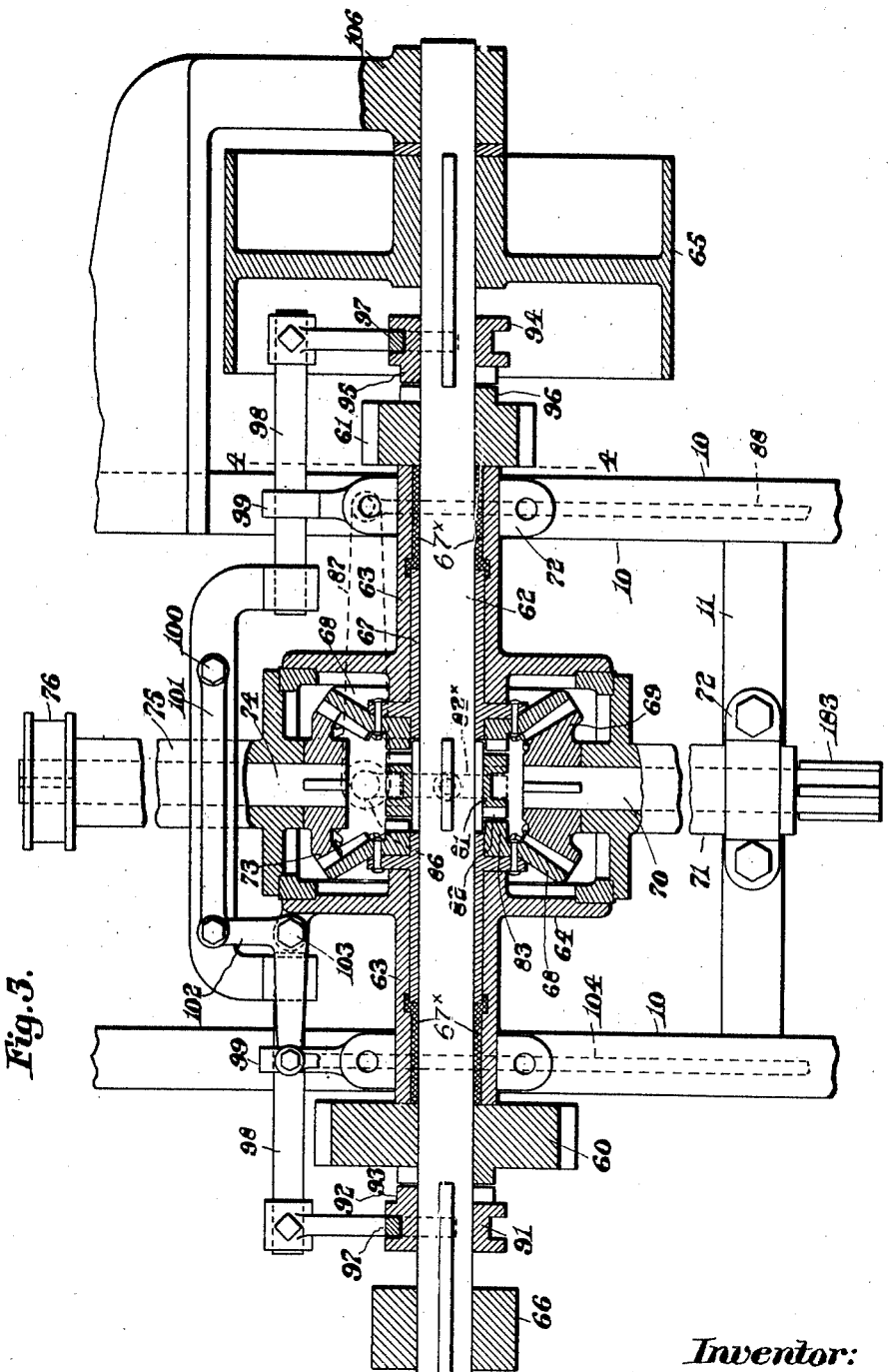
Fig. 3 represents a horizontal section of the transmission mechanism.
Figure 4:
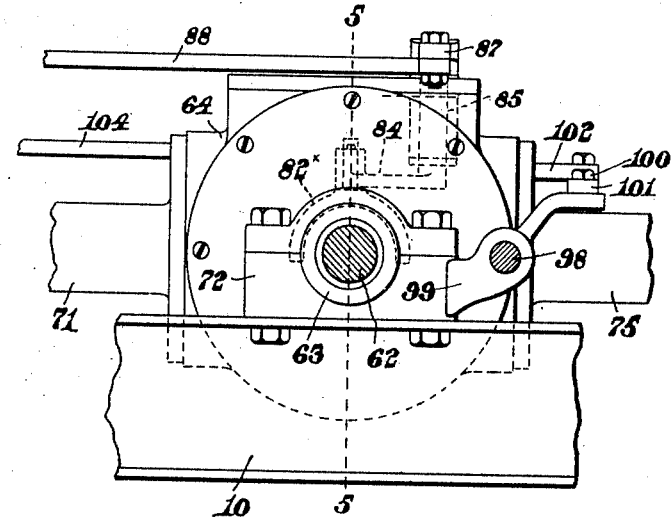
Fig. 4 represents a vertical section of same, on line 4, 4 on Fig. 3.
Figure 5:
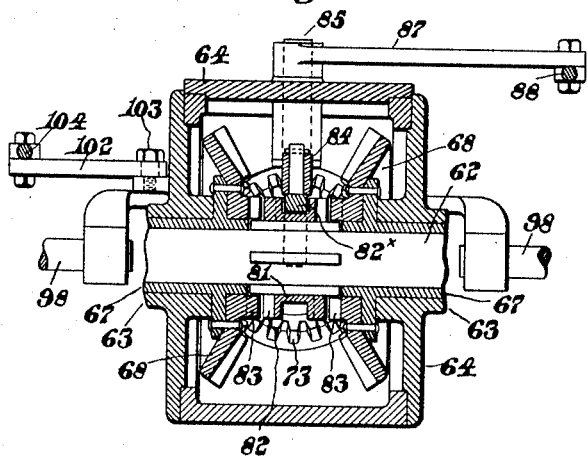
Fig. 5 represents a transverse vertical section of a portion of the same on line 5, 5 on Fig. 4.

When the member 81 is in an intermediate position, as indicated in Fig. 3, it is evident that no rotary movement will be imparted to the shaft 62, as the gears 68 will freely rotate thereon.

The clutch member 81 is provided with a peripheral groove in which is positioned the bifurcated member 82ˣ fulcrumed in an arm 84 pivoted at 85 in the casing 64, the upper end of the pivot member 85 having an arm 87 secured thereto, to the outer end of which is pivotally connected one end of the operating rod 88, the opposite end of which is connected to the operating lever 89 pivoted at 90 to a frame 10 a short distance in front of the driver's seat 13.

Between the pulley 66 and the high speed gear 60 is located a clutch member 91 keyed to and slidable on the shaft 62, said clutch member being provided with locking projections 92 adapted to coact with similar projections 93 on said gear 60.

When the projections 92, 93 are engaged, any rotary movement of the shaft 62 in either direction will be imparted to the gear 60, and through it to the gear 28ˣ on the jack shaft 23ˣ.

Between the pulley 65 and the low speed gear 61 is located a clutch member 94 keyed to and slidable on the shaft 62, said clutch member being provided with locking projections 95 adapted to coact with similar projections 96 on said gear 61.

When the projections 95, 95 are engaged, any rotary movement of the shaft 62 in either direction will be imparted to the gear 61 and through it to the gear 27ˣ on the jack shaft 23ˣ.

The clutch members 91 and 94 are each provided with a peripheral groove in which is positioned a forked member 97 secured to a slidable member 98 movable transversely of the side frames 10, 10 in bearings 99 mounted on said side frames.

The slidable member 98 has pivoted thereto, at 100, a link 101, the opposite end of which is pivotally connected to one arm of a bell crank lever 102 pivoted at 103 to the casing 64, the other arm of said lever 102 being connected to one end of a rod 104, the opposite end of which is connected to an operating lever 105 pivoted to a side frame 10 in advance of the operator's seat 13.

By means of this lever 105 the operator may move the slidable member 98 so that both clutch members 91, 94 will be in neutral position, or either one of them will be in engagement with its coacting gear.

It is obvious, however, from an inspection of the drawings, that the mechanism is so constructed as to effectually prevent both clutch members being simultaneously engaged with their coacting gears.

By the construction just described, the small pulley 66 may be driven while the tractor is standing still, or, if desired, while the tractor is moving over the surface. The large pulley 65 may likewise be rotated from the engine under similar conditions. Furthermore, the driving wheels may be driven in unison at different speeds, and independently of each other, as has been described.

The shaft 62 extends beyond the large pulley 65 and is supported in an outboard bearing 106 secured to one of the side frames 10, said outboard bearing 106 bracing the pulley shaft 62 and preventing it from being strained or forced out of alinement.

The motor or engine 107 is located directly over the rear axle 15, 17, thereby assuring sufficient weight in order to give traction on the driving wheels 18.

The engine 107 is connected by the pipe 108 with the radiator 109, which may be of any well-known construction. This radiator 109 has secured thereto a support 110 for the fan 77 and its driving shaft 80 and the pulley 79 thereon.

The radiator 109 is braced by two horizontal members 111 extending to the rear of the tractor, the rear ends of which are secured to uprights 112 extending upwardly from the side frames 10.

One of these uprights 112 has secured thereto a bearing 113 for the shaft 114 which is rotatable by the hand wheel 115, and has its forward end connected by a universal joint 116 to a worm shaft 117 having secured thereto a worm 118 meshing with a gear segment 119 secured to a vertical shaft 120 mounted in a bearing 121 forming a part of the casing 122 inclosing said worm 118 and gear segment 119.

The casing 122 is secured to one of the side members 10 and to a transom 123 connecting the front ends of the side members 10.

Depending from the rear face of the transom 123 is a bracket 124, the lower end of which is positioned between upwardly extending ears 125 formed upon a plate 126 extending transversely of said side members 10, 10.

The ears 125 are pivotally connected to the lower end of the bracket 124 by means of a pivot pin 127.

To the rear of the transom 123, the side members 10, 10 are also connected together by means of a horizontal plate 128 secured to the under sides of said side members 10, 10.

This plate 128 has secured to its lower face a member 129 having depending ears 130 between which is positioned a vertical rocking member 131, said rocking member being pivoted to said ears 130 by means of a pivot pin 132 in alinement with the pivot pin 127.

The plate 126 is provided with bearings 133 at the opposite ends thereof, and has extending laterally therefrom the curved extensions 134 concentric with the bearings 133. Beneath the plate 126 is an under plate 135, similar in outline to and separated from the upper plate 126 by means of tubular members 136, through each of which extends a bolt 137, having a nut 138 threaded to the lower end thereof.

The opposite ends of said lower plate 135 are provided with bearings 139 in alinement with the bearings 133 and between said bearings 133, 139 are positioned the hubs 140 of the stub axles 141, through which hubs extend pivot members 142, mounted in the bearings 133 and 139.

The front or steering wheels 143 are mounted on the stub axles 141 in any usual manner.

Each hub 140 of the stub axles 141 has an extension 144 on the end of which is mounted a revoluble truck 145 adapted to travel between the laterally extending curved tracks 134 formed upon the upper and lower plates 126 and 135.

Each hub 140 is also provided with a laterally extending arm 146, the outer end of which is provided with a pivot pin 147 extending through the forked ends of a rod 148 connecting said arms so that said stub axles may be moved simultaneously about the pivot members 142.

One of the pins 147 has mounted thereon a member 149 to which is pivoted at 149$^x$ one end of a rod 150, the opposite end of which is provided with a forked member 151 straddling and pivoted to a member 152 adapted to oscillate about a cylindrical projection 153 on the outer end of a lever 154 secured to the lower end of the oscillating shaft 120.

By rotating the rod 114 motion is imparted to the gear segment 119 by means of the worm 118 and the lever 154 is thereby moved about the axis of the shaft 120.

This movement, through the link or rod 150, causes the arms 146 and stub axles 141 to be moved about the axes of their pivots 142. During this movement of the axles 141 about the pivots 142, the trucks 145 move along the curved tracks 134 extending laterally from the upper and lower plates 126 and 135.

These tracks are separated from each other slightly in excess of the diameter of the trucks 145, which normally bear upon the lower track. The two plates 126, 135 with their various connections, form a frame for the stub axles 141 which are pivoted to said frame in such a manner that they may be easily moved about their pivots 142 to guide the tractor by simply rotating the operating rod 114.

Connected to the lower plate 145, at 155, are brace rods 156, the opposite end of each of which is threaded and extends through an opening in one end of the rocker member 131, and has mounted thereon the adjusting nuts 157 and 158, on opposite sides of said rocker member 131.

These brace rods 156 give a greater rigidity to the front axle frame and permit the said frame and rocker member 131 to tilt respectively about the pivot pins 127 and 132 when the tractor is passing over uneven surfaces.

Figure 6:
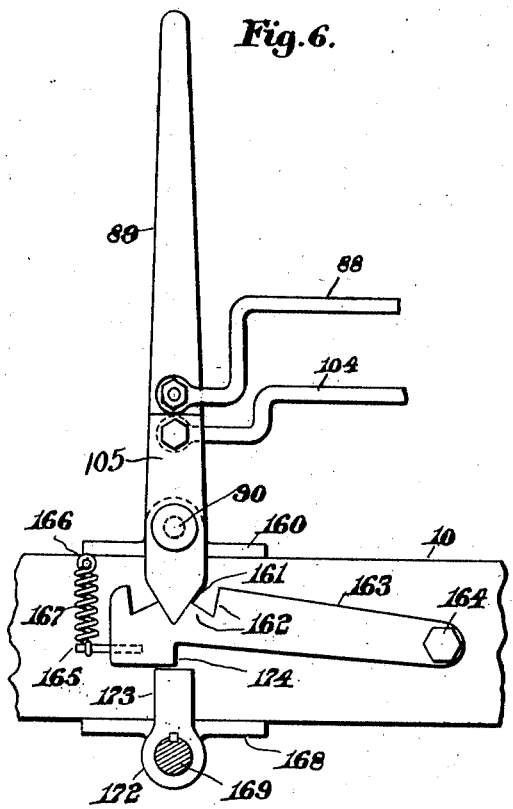
Fig. 6 represents an elevation of the gear changing lever and its locking device the upper portion of said view being shown in elevation in order to show the nearest lever while the lower portion of said view is shown in section to show the lower end of the farther lever and the parts coacting therewith.
Figure 8:
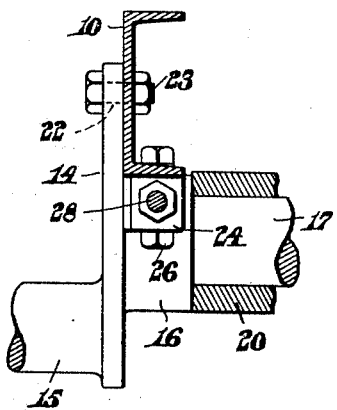
Fig. 8 represents a vertical section of the same, on line 8, 8 on Fig. 7, said view being drawn to an enlarged scale.
Figure 7:
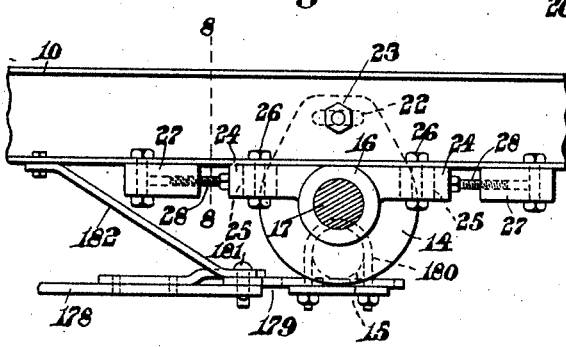
Fig. 7 represents an elevation of the rear axle, its support, and the draw bar attached thereto.
Figure 9:
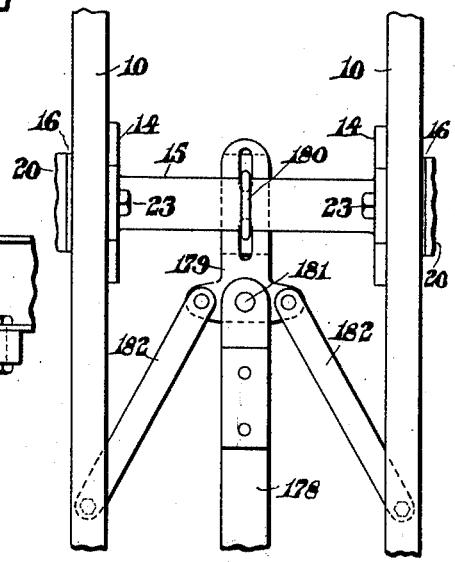
Fig. 9 represents a plan of the rear axle, its support, and the draw bar attached thereto.
Figure 10:
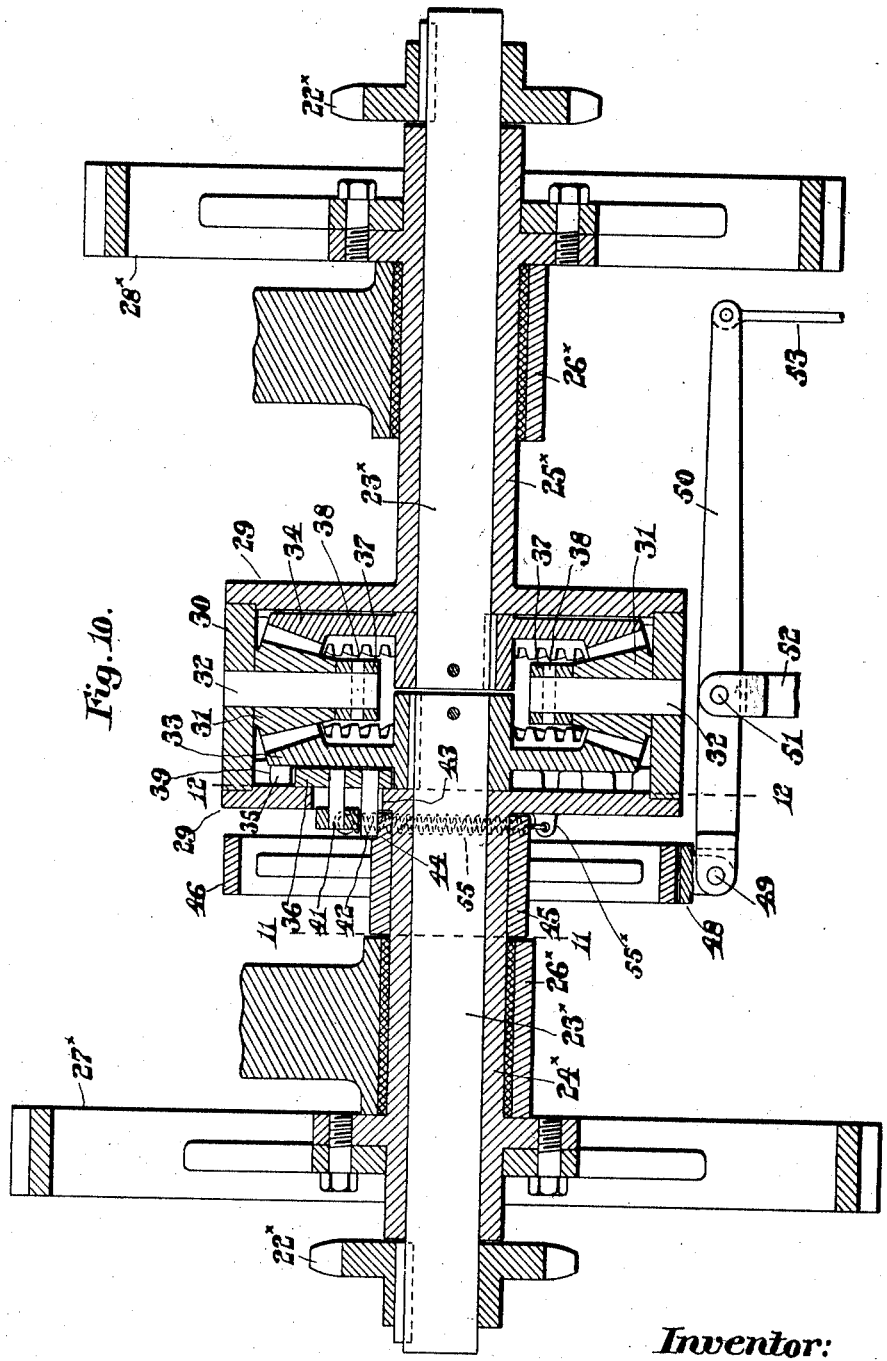
Fig. 10 represents a longitudinal section through the jack shaft and locking device for differential gears, on line 10, 10, on Fig. 11.
Figure 11:
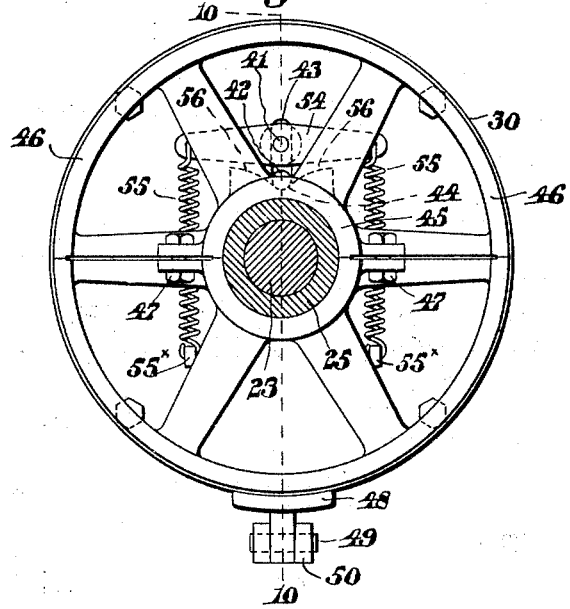
Fig. 11 represents a transverse section thereof on line 11, 11 on Fig. 10.
Figure 12:
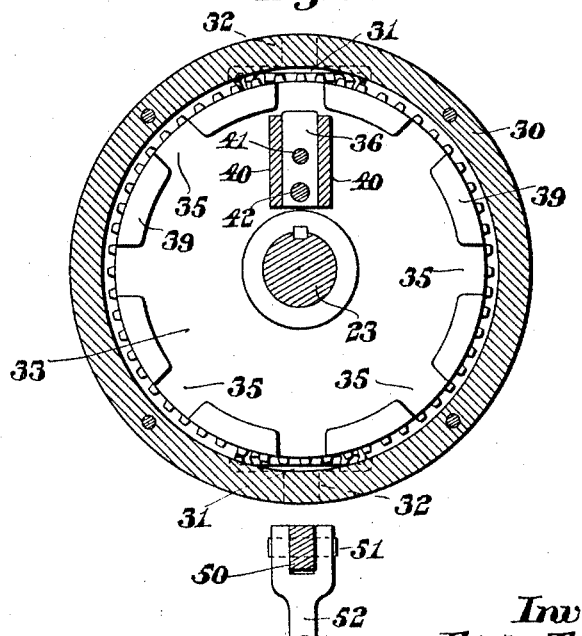
Fig. 12 represents a transverse section of the same on line 12, 12 on Fig. 10.

The operating levers 89 and 105 are alike, the former having the rod 88 connected thereto, while the rod 104 is connected to the lever 105, as shown in Fig. 6.

The pivots 90 of said levers 89 and 105 are in alinement, said pivots being carried by brackets 160 secured to the upper faces of the side members 10, 10.

The lower ends of the levers 89, 105 are provided with pointed ends 161, adapted to coact with the V-shaped notches 162 formed in the upper edges of the locking arms 163 pivoted at 164 to the inner faces of the side members 10, 10.

A pin 165 extends from the face end of the locking arm 163 and between this pin and a pin 166 in a side frame 10 is a spring 167, adapted to retain said arm 163 in engagement with the pointed end 161 of the lever 89 or 105.

Each pivoted arm 163 is provided with three notches 162 and when the pointed ends 161 are in the central notches the clutch members 81, 91, and 94 will all be in neutral position.

To the under side of the side frames 10, 10 are secured bearings 168, in which is mounted an oscillating shaft 169, to the outer end of which is secured a clutch pedal 170, the free end of which is provided with a foot pad 171.

Keyed to the shaft 169 beneath the pivoted arms 163 are two collars 172 having upwardly extending projections 173 in the path of movement of said arms 163 about their pivots 164.

When the clutch pedal 170 is in its normal position, the projections 173 prevent any downward movement of the arms 163, and consequently the clutch members 81, 91, and 94 cannot be moved until the lever 170 has been moved about its pivot 169 and the projection 173 has been moved forward beyond the shoulder 174 on said arms 163.

When the projection 173 has been moved forwardly beyond the shoulder 174, either lever 89 or 105 may be moved about its pivot against the tension of the spring 161 until the pointed end 161 is positioned in one of the other notches 162.

The rear ends of the side frames 10, 10 are connected together by the crossbar 12, from which depend the corner members 176 connected together near their lower ends by the tie plates 177 separated sufficiently to receive the draw bar 178, the inner end of which is bifurcated to receive the plate 179 suspended from the rear axle 15 by the bail 180, and to which said draw bar is pivoted by the pin 181.

The plate 179 has outwardly extending ears at the rear end, to which are connected one end of the braces or struts 182, the opposite ends of which are secured to the under faces of the side members 10, 10.

By means of this construction, the draw bar 178 is free to swing about the pivot 181, and the strain thereon is to a large degree taken up by the braces 182.

The rear end of the shaft 70 is provided with a plurality of keys 183 to receive a coupling 184 slidable thereon, the opposite end of said coupling having a shaft 185 extending therefrom, the end of which is squared as indicated at 186.

On the squared end 186 is mounted a slidable collar 187, the hub of which has mounted thereon a sleeve 188 provided with laterally extending projections 189, adapted to coact with the ends of the bifurcated lever 190 to prevent said sleeve from rotating about the axis of the shaft 185.

The sleeve 188 is provided with a peripheral flange 191 between which and the collar 187 is interposed a fiber washer 192.

The lever 190 is secured to an oscillating shaft 192 having a lever 193 secured thereto, the outer end of which is connected by a rod 194 with the pedal lever 170.

On the forward end of the engine shaft 195 is a peripheral flange 196 to which is secured by bolts 197 a fly wheel 198, having a forwardly extending annular flange 199.

Within the annular flange 199 is a filler ring 200 of fiber, the inner wall of which is cone-shaped as indicated at 201 in Fig. 17.

Abutting the forward face of the filler ring 200 is an annular compression member 202, through which and the filler ring 200 extend a plurality of bolts 203, the rear ends of which are secured to the fly wheel 198, while the forward ends are each provided with a nut 204 which may be adjusted to force the compression member 202 toward the fly wheel 198 to give sufficient compression to the filler ring 200.

Within the filler ring 200 and normally contacting therewith is a movable cone-shaped clutch member 205 having a tubular hub 206 positioned within a cylindrical member 207 secured to the fly wheel 198.

Between the hub 206 and the cylindrical member 207 are interposed a plurality of antifriction members 208.

The forward end of the hub 206 is provided with a thrust bearing 209, between which and the flanged end 196 of the engine shaft 195 is interposed a spring 210, which normally retains the cone-shaped periphery of the movable clutch member 205 in frictional contact with the wall 201 of the filling ring 200.

To the forward face of the clutch member 205 are secured clips 211, having end projections positioned in notches 212 in the periphery of the member 187 to prevent the separation of these members 187 and 205, and insuring their rotation in unison.

The rear wall of the collar 187 is provided with diametral projections 213, which are adapted to be positioned in a diametral recess 214 in an intermediate member 215 having on its opposite face a diametral recess 216 into which extend the projections 217 formed on the forward face of the member 205.

This construction forms a universal connection between the clutch member 205 and the shaft 185, and makes it possible for rotary movement to be imparted from the former to the latter, even when these two members are slightly out of alinement.

When the operator presses on the pedal lever 170, the lever 190 acting on the member 205 moves this member 205 against the tension of the spring 210 and breaks the contact between the member 205 and the wall 201, thus preventing the transmission of further rotary movement to the shaft 185 as long as the connection between the clutch members remains broken.

When the operator removes his foot from the pedal lever 170, the spring 210 will act to bring the clutch members 201—205 into engagement again.

A frame 218 extends upwardly from the side members 10 and supports the gasolene tank 219.

This makes a very effective tractor for farm use capable of being used for a variety of purposes.

It is believed that its operation and many advantages will be fully understood without further description.

Having thus described my invention, I claim:

1. In a tractor, a motor; a shaft driven thereby; a bevel pinion thereon; oppositely disposed bevel gears meshing with said pinion; a casing having alined bearings; a sleeve for each gear and to which said gear is secured, said sleeves having hubs mounted in enlarged cylindrical chambers formed in said bearings; a service shaft on which said sleeves are loosely mounted provided with keys between said gears and revoluble in the outer ends of said bearings; a single clutch member slidable on said shaft and rotated therewith by said keys; a clutch member revoluble with each gear and with either of which said slidable clutch member is adapted to coact; and a pulley on one end of said shaft.

2. In a tractor, a motor; a shaft driven thereby; a bevel pinion thereon; oppositely disposed bevel gears meshing with said pinion; a casing having alined bearings; a sleeve for each gear and to which said gear is secured, said sleeves having hubs mounted in enlarged cylindrical chambers formed in said bearings; a service shaft on which said sleeves are loosely mounted provided with keys between said gears and revoluble in the outer ends of said bearings; a single clutch member slidable on said shaft and rotated therewith by said keys; a clutch member revoluble with each gear and with either of which said slidable clutch member is adapted to coact; and pulleys of different diameters on the opposite ends of said shaft.

3. In a tractor, a motor; a shaft driven thereby; a bevel pinion thereon; oppositely disposed bevel gears meshing with said pinion; a sleeve to which each gear is secured; a service shaft on which said sleeves are loosely mounted provided with keys between said gears; a clutch member slidable on said shaft and rotated therewith by said keys; a clutch member revoluble with each gear and with either of which said slidable clutch member is adapted to coact; a pulley on one end of said shaft; and an outboard bearing for the pulley supporting end of said shaft.

4. In a tractor, a motor; a shaft driven thereby; a bevel pinion thereon; oppositely disposed bevel gears meshing with said pinion; a sleeve for each gear and to which said gear is secured; a service shaft on which said sleeves are loosely mounted provided with keys between said gears; driving members on said service shaft for imparting rotary movement to other machines; a clutch member slidable on said shaft and rotated therewith by said keys; a clutch member revoluble with each gear and with either of which said slidable clutch member is adapted to coact; and means independent of said driving members on said shaft for transmitting motion to the tractor driving mechanism.

5. In a tractor, a motor; a shaft driven thereby; a bevel pinion thereon; oppositely disposed bevel gears meshing with said pinion; a sleeve for each gear and to which said gear is secured; a service shaft on which said sleeves are loosely mounted provided with keys between said gears; pulleys on the opposite ends of said shaft; a clutch member slidable on said shaft and rotated therewith by said keys; a clutch member revoluble with each gear and with either of which said slidable clutch member is adapted to coact; and gears on said shaft of different diameter for transmitting motion to the tractor driving mechanism at different speeds.

6. In a tractor, a motor; a shaft driven thereby; a service shaft; pulleys thereon for imparting rotary movement to other machines; means interposed between said shafts for driving said service shaft in either direction; clutch members slidably mounted on the opposite ends of said shaft; gears loosely mounted on said shaft and each provided with projections adapted to engage said clutch members; and a single slidable clutch moving member normally retaining said clutch members disengaged from said gears but adapted to be moved to engage either clutch member with its coacting gear.

7. In a tractor, a motor; a shaft driven thereby; a service shaft; pulleys thereon for imparting rotary movement to other machines; means interposed between said shafts for driving said service shaft in either direction; clutch members slidably mounted on the opposite ends of said shaft; gears of different diameters loosely mounted on said shaft and each provided with projections adapted to engage said clutch members; and a single slidable clutch moving member normally retaining said clutch members disengaged from said gears but adapted to be moved to engage either clutch member with its coacting gear.

8. In a tractor, a motor; a shaft driven thereby; a service shaft; connecting means between said shafts for driving said service shaft in either direction; clutch members slidably mounted on the opposite ends of said shaft; gears loosely mounted on said shaft and each provided with projections adapted to engage said clutch members; a casing for said shaft connecting means provided with hubs containing bearings for the driving shaft and said service shaft; and a clutch moving member slidably mounted on said casing normally retaining said clutch members disengaged from said gears but adapted to be moved to engage either clutch member with its coacting gear.

9. In a tractor, a motor; a shaft driven thereby; a service shaft; connecting means between said shafts for driving said service shaft in either direction; clutch members slidably mounted on the opposite ends of said shaft; gears loosely mounted on said shaft and each provided with projections adapted to engage said clutch members; a casing for said shaft connecting means provided with hubs containing bearings for the driving shaft, the hubs of said gears, and said service shaft; and a slidable clutch moving member mounted on said casing normally retaining said clutch members disengaged from said gears but adapted to be moved to engage either clutch member with its coacting gear.

10. In a tractor, a motor; a shaft driven thereby; a service shaft; a fan driving shaft alined with said driving shaft; a casing provided with hub bearings for said shafts; driving members on the opposite ends of said service shaft; and mechanism within said casing operable by said driving shaft for transmitting rotary movement to said service shaft and fan driving shaft.

11. In a tractor, a motor; a shaft driven thereby; a service shaft; a fan driving shaft alined with said driving shaft; a casing provided with hub bearings for said shafts; driving members on the opposite ends of said service shaft; and mechanism within said casing operable by said driving shaft for transmitting rotary movement to said fan driving shaft and to said service shaft in either direction.

12. In a tractor, a motor; a shaft driven thereby; a service shaft; pulleys thereon for imparting rotary movement to other machines; a bevel gear on said motor shaft; bevel gears revolubly mounted on said service shaft on opposite sides of said motor shaft gear; a member keyed to said service shaft and adapted to be connected with either of the service shaft gears and impart rotary movement thereto; a casing inclosing said gears and keyed member and provided with outwardly extending hubs having at the outer ends bearings for said shafts and at the inner ends enlarged cylindrical chambers; and tubular members secured to said service shaft gears and surrounding said service shaft and extending into said chambers.

13. In a tractor, a motor; a shaft driven thereby; a service shaft; a bevel gear on said motor shaft; bevel gears revolubly mounted on said service shaft on opposite sides of said motor shaft gear; a member keyed to said service shaft and adapted to be connected with either of the service shaft gears and impart rotary movement thereto; a casing inclosing said gears and keyed member and provided with bearings for said shafts; tubular members secured to said service shaft gears and surrounding said service shaft within said bearings; and bushings in said bearings the inner ends of which bear against the outer ends of said tubular members.

14. In a tractor, a motor; a shaft driven thereby; a service shaft; means interposed between said shafts for driving said service shaft in either direction; clutch members slidably mounted on the opposite ends of said shaft; gears of different diameters loosely mounted on said shaft and each provided with projections adapted to engage said clutch member; a casing having alined hubs forming bearings for said service shaft; supports therefor; and a slidable clutch moving member mounted in alined bearings in said supports.

15. In a tractor, a motor; a shaft driven thereby; a service shaft; means interposed between said shafts for driving said service shaft in either direction; clutch members slidably moutned on the opposite ends of said shaft; gears of different diameters loosely mounted on said shaft and each provided with projections adapted to engage said clutch member; a casing having alined hubs forming bearings for said service shaft; supports therefor; a slidable clutch moving member mounted in alined bearings in said supports; a bell-crank lever pivoted to said casing; and a link connection between said lever and said clutch moving member.

Signed by me at Waukegan, Ill., this 20th day of March, 1918.

EDDY T. McKAIG.

Witness:
ELIZABETH A. MAGUIRE.